(12) United States Patent
Peviani

(10) Patent No.: US 12,060,785 B2
(45) Date of Patent: Aug. 13, 2024

(54) METHOD FOR PRODUCING ELECTRICITY IN AN OIL PLATFORM AND INSTALLATION FOR IMPLEMENTING SAME

(71) Applicant: OIL2GREEN, Aix-les-Bains (FR)

(72) Inventor: Gianluca Peviani, Aix-les-Bains (FR)

(73) Assignee: OIL2GREEN, Aix-les-Bains (FR)

( * ) Notice: Subject to any disclaimer, the term of this patent is extended or adjusted under 35 U.S.C. 154(b) by 0 days.

(21) Appl. No.: 17/684,455

(22) Filed: Mar. 2, 2022

(65) Prior Publication Data
US 2022/0282695 A1    Sep. 8, 2022

(30) Foreign Application Priority Data
Mar. 3, 2021 (FR) ........................ 2102064

(51) Int. Cl.
*E21B 43/38* (2006.01)
*E21B 43/24* (2006.01)

(52) U.S. Cl.
CPC .......... *E21B 43/38* (2013.01); *E21B 43/2401* (2013.01); *F05B 2220/706* (2013.01); *F05B 2240/911* (2013.01); *F05B 2240/95* (2013.01)

(58) Field of Classification Search
CPC .. E21B 43/2401; E21B 41/0085; E21B 43/38; E21B 36/02; E21B 41/0042; E21B 43/24; E21B 43/305
See application file for complete search history.

(56) References Cited

U.S. PATENT DOCUMENTS

2011/0061383 A1* 3/2011 McAlister ............... F03B 13/14
29/890.033

FOREIGN PATENT DOCUMENTS

WO    WO-2009009447 A2 *  1/2009  ............. E21B 36/02

* cited by examiner

*Primary Examiner* — Zakiya W Bates
(74) *Attorney, Agent, or Firm* — Clark & Brody LP

(57) ABSTRACT

A method for producing electricity from an existing oil platform designed to extract petroleum oil from an underground deposit comprises the following steps: extracting a mixture of petroleum oil and water from the underground deposit under a pressure P2 via a first extraction pipe (11); circulating the extracted mixture so as to actuate an electricity generating turbine by kinetic energy in order to generate electricity; and supplying a power grid with at least a fraction of the electricity generated by the generating turbine.

6 Claims, 4 Drawing Sheets

[Fig. 1]
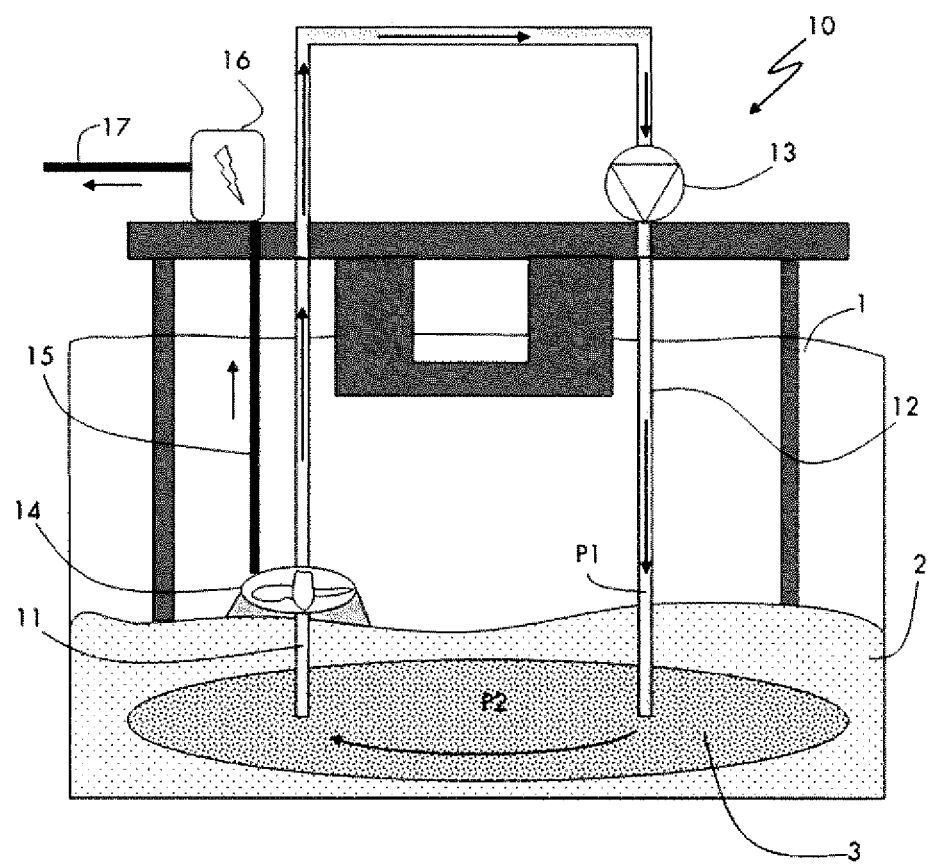

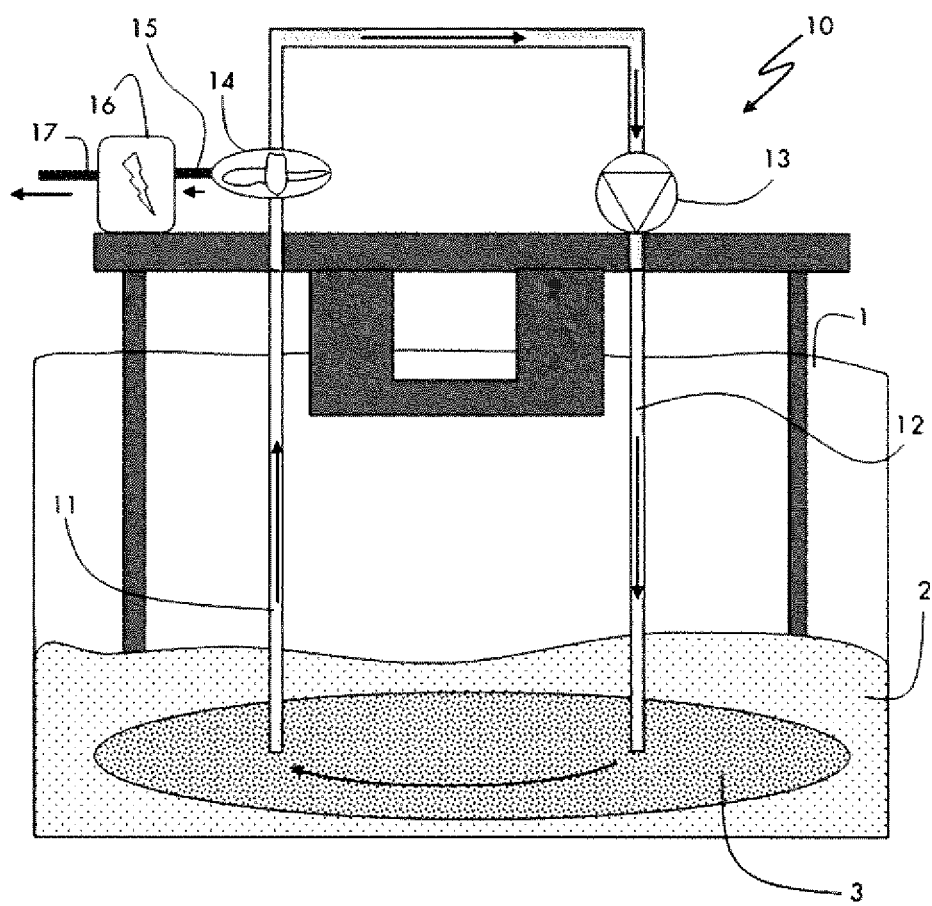
[Fig.2]

[Fig.3]
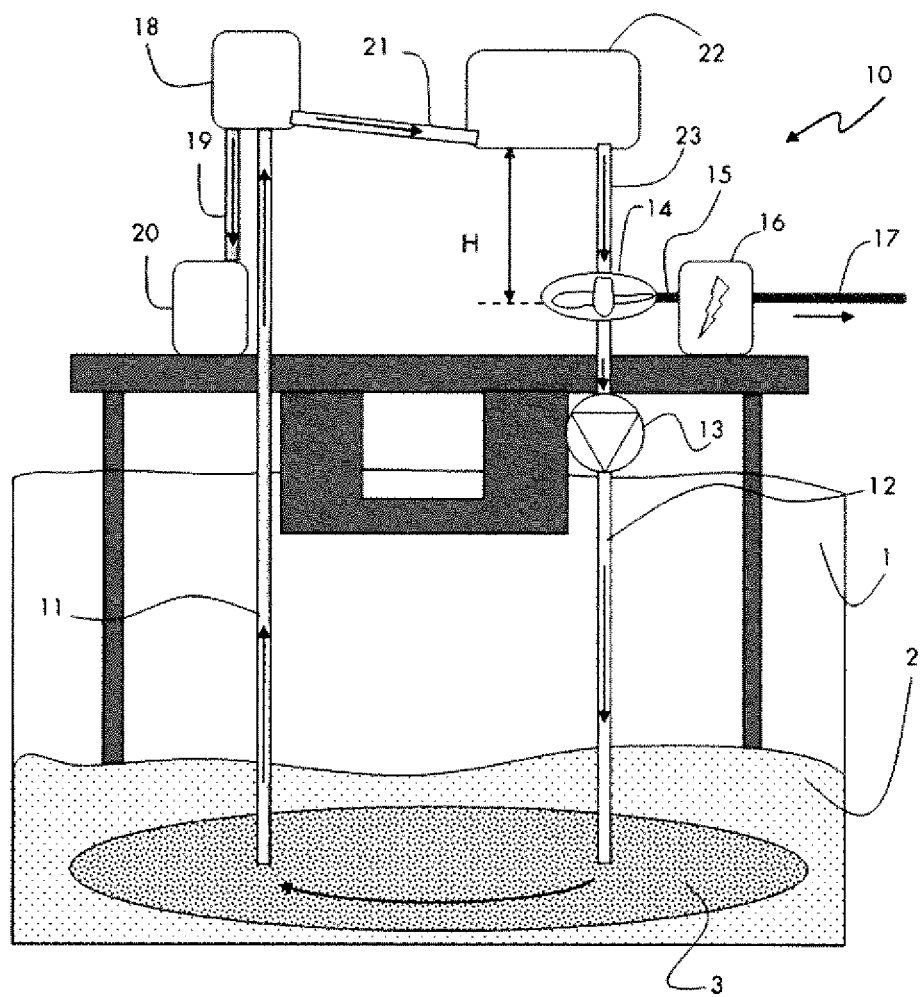

[Fig.4]
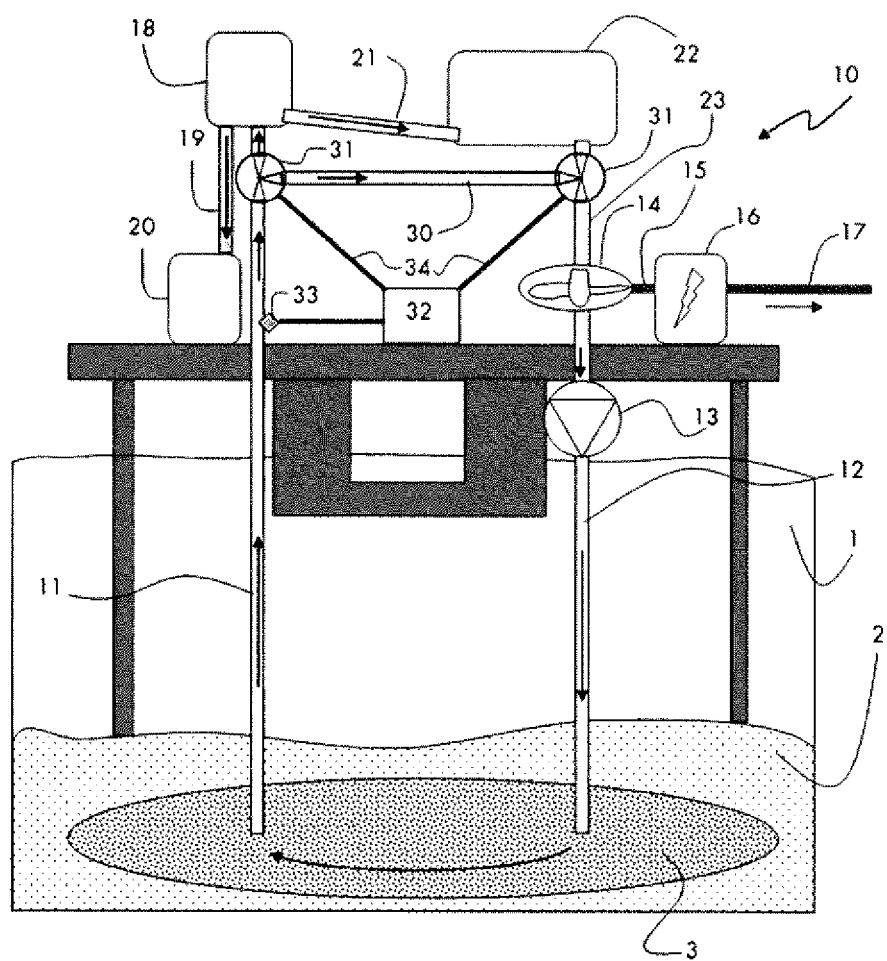

METHOD FOR PRODUCING ELECTRICITY IN AN OIL PLATFORM AND INSTALLATION FOR IMPLEMENTING SAME

The invention relates to a method for producing electricity in an existing oil platform and to an installation for implementing same. The invention applies to an off-shore installation, provided that the platform is fixed, that is to say not floating. The invention also applies to an on-shore installation.

During the production and marketing phase of an off-shore or on-shore oil platform, an oil well extracts a mixture mainly made up of petroleum oil, water and gas from the oil deposit via a first pipe. This extraction takes place naturally, since the oil deposit is at a pressure greater than atmospheric pressure, and so the mixture naturally tends to rise toward the platform, with pressures of between 100 and 700 bar.

To maintain this extraction over time, it is necessary to maintain the pressure within the deposit, and so platforms are equipped with injection pumps which inject the fluid extracted via a second pipe, ultimately allowing the mixture to rise via the first pipe. If necessary, an extraction fluid can be injected, such as a gas (for example $CO_2$ or $H_2S$), some of the water from the previously extracted mixture or sea water.

On average, during the economically profitable phase of the oil installation, it is known that, for one barrel of oil produced at the surface from the mixture from the deposit, around three barrels of water are also brought to the surface. The deposits differ from one another and produce different mixtures, i.e. ones having different oil/water proportions and throughputs.

Depending on its quality, and therefore on its oil/water ratio, the extracted mixture passes through an oil/water separator in order to separate the petroleum oil and the water.

Currently, the water originating from this separation is usually poured back into the ocean or reinjected into the deposit or partially reused in other stations.

The oil platform is operated as long as the oil/water ratio remains above a threshold value, which is a function of the economic profitability. During the extraction of the oil deposit, this ratio becomes increasingly low, such that more water than oil is extracted. The deposit is used up upon reaching and below the threshold value, and the extraction of oil is no longer commercially profitable. The operating company stops extraction operations and the platform is either abandoned pending use, or usually dismantled. This operation is lengthy and very expensive.

One objective of the present invention is to be able to extend the duration of operation of an oil extraction platform while allowing profitable, useful rehabilitation and allowing the flexible, on-demand and non-intermittent production of environmentally clean electricity.

Another objective of the present invention is to propose a versatile method, i.e. one that is adaptable to the quality of the mixture from the oil deposit.

The idea on which the invention is based is that of modifying an existing platform to create a circulation loop for the mixture extracted from the deposit and of using the kinetic energy created by the pressure of the jet of the mixture (water, non-oily fluid or gas ($CO_2$)) leaving the used-up oil deposit to generate, by means of a hydroelectric turbine, electricity which could be sent into a power grid or stored in batteries, while resupplying the deposit and maintaining the pressure therein. The invention therefore makes it possible to modify a platform that is not being used into a flexible hydroelectric plant that is available for supplying electrical energy on demand.

More specifically, a subject of the invention is a method for producing electricity with an existing oil extraction installation designed to extract petroleum oil and water from an underground deposit, the method comprising the following steps:
 a) a mixture of petroleum oil and water from the underground deposit is extracted under a pressure $P2$ via a first extraction pipe;
 d) the extracted mixture is made to circulate so as to actuate an electricity generating turbine by kinetic energy in order to generate electricity;
 e) a power grid is supplied with at least a fraction of the electricity generated by the generating turbine.

According to particular embodiments:
 the method may comprise, between step a) and step d), a step b) of separating the petroleum oil and the water when the oil/water ratio in the mixture from the deposit is greater than a given threshold value, and a step c) of temporarily storing the water obtained at a given minimum height with respect to the generating turbine;
 the method may also comprise a step f) of injecting an extraction fluid into the underground deposit under a pressure $P1$ with an injection pump, via a second injection pipe;
 the pressure $P1$ may be adjusted so as to keep the pressure $P2$ at a given value for actuating the electricity generating turbine by kinetic energy in order to generate electricity;
 the extraction fluid may comprise at least a part of the mixture extracted in step a);
 the injection pump may be supplied with electricity using at least a fraction of the electricity generated by the generating turbine, in order to repeat steps a) to e);
 the extraction fluid may comprise $CO_2$ gas, a part of the extracted mixture, and/or sea water;
 the power grid may comprise a member for storing electricity; and/or
 steps b) and c) may be omitted when the proportion of oil in the extracted mixture drops below the given threshold value.

A further subject of the invention is equipment for producing electricity for an existing oil extraction installation, designed to extract a mixture of petroleum oil and water from an underground deposit, the oil extraction installation comprising a first pipe for extracting the mixture of oil and water from the underground deposit under a pressure $P2$, the equipment comprising:
 an electricity generating turbine fluidically connected to the first pipe and actuable by kinetic energy when the mixture extracted from the underground deposit passes through it in order to generate electricity;
 an electric circuit between the turbine and a member for storing and/or transmitting the electricity generated by the turbine.

According to particular embodiments:
 the equipment may also comprise, upstream of the generating turbine, a water/petroleum oil separator from which a petroleum oil line extends toward a petroleum oil tank, and a water line extends toward a water tank, the water tank being fluidically connected by a pipe to the generating turbine, and arranged at a given height with respect to the generating turbine in order that the water falls under gravity into the generating turbine and actuates it by kinetic energy;

the equipment may also comprise a bypass line connected by a valve to the first pipe upstream of the water/oil separator on one side and to the pipe supplying the generating turbine from the water tank on the other side;

the equipment may also comprise a bypass line connected by a valve to the first pipe upstream of the water/oil separator on one side and to the water tank on the other side;

the equipment may also comprise a bypass line connected by a valve to the first pipe upstream of the water/oil separator on one side and to the generating turbine on the other side;

the equipment may also comprise at least one sensor for sensing the composition of the extracted mixture and a central processing unit programmed to determine the oil/water ratio in the extracted mixture, to compare it with a given threshold value stored in a memory, and to control the valves to make the extracted mixture circulate via the bypass line directly from the first extraction pipe to the generating turbine when the oil/water ratio in the extracted mixture is below the given threshold value;

the equipment may also comprise a pump for injecting extraction fluid into the underground deposit under a pressure P1 via a second injection pipe, the first pipe being fluidically connected to the injection pump so as to form a fluid circulation loop entering and leaving the underground deposit; and/or the generating turbine may be a turbine of the axial type, or of the Pelton type;

the generating turbine may be a turbine chosen from turbines of the Kaplan type, of the Francis type, and of the axial type.

Further features of the invention are set out in the following detailed description with reference to the appended figures, given by way of example, in which, respectively:

FIG. 1 shows a schematic view of an installation according to the invention, comprising an electricity generating turbine submerged at the seabed;

FIG. 2 shows a schematic view of an installation according to the invention, comprising an electricity generating turbine arranged on the platform;

FIG. 3 shows a schematic view of an installation according to the invention, comprising a separator and a water tank upstream of the generating turbine;

FIG. 4 shows a schematic view of an installation similar to the one in FIG. 3 and also comprising a bypass line.

FIGS. 1 to 4 illustrate embodiments relating to an offshore oil platform. Of course, the equipment according to the invention and illustrated in FIGS. 2 to 4 is adaptable to an on-shore oil installation.

FIG. 1 illustrates equipment for producing electricity according to the invention, which is arranged on a pre-existing oil platform 10 positioned and installed so as to extract a mixture of petroleum oil and water from an underground deposit 3 located under the seabed 2 of the sea 1.

The oil platform 10 comprises a first pipe 11 for extracting the mixture of oil and water from the underground deposit 3 under a pressure P2 which allows the natural extraction of the mixture. The first pipe 11 therefore fluidically connects the underwater deposit 3 and the platform 10. By way of indication, the tubes of the first pipe 11 have a diameter of between 15 and 55 cm.

In order to compensate for the reduction in the pressure caused by the extraction, the platform comprises a pump 13 for injecting extraction fluid into the underground deposit 3 under a pressure P1 via a second injection pipe 12. Usually, the extraction fluid may be a gas, such as $CO_2$, some of the water from the previously extracted mixture, from which the petroleum oil has been extracted, or sea water.

As explained above, the extracted mixture is more or less rich in petroleum oil and tends, as extraction continues, to be depleted in petroleum oil. When the petroleum oil/water ratio drops below the economic profitability threshold, it is useful to implement the invention to generate electricity durably, by virtue of a flexible and non-intermittent source.

The invention is very versatile, since it can be implemented even when the mixture still contains oil, as explained for the second embodiment illustrated in FIGS. 3 and 4. The first embodiment illustrated in FIGS. 1 and 2 relates to the situation in which the petroleum oil/water mixture is very poor in oil, such that it can be considered to contain mostly water. In this case, the extraction fluid used to compensate for the drop in pressure within the deposit is made up of the fluid directly extracted, and so the fluid injected is identical to the fluid extracted.

The second pipe therefore fluidically connects the platform 10 and the underground deposit 3.

Advantageously, the pressure P1 is variable in order to maintain the pressure P2 at the desired value for implementing the method according to the invention (in particular for passing through a turbine as will be described below).

According to the invention, the first pipe 11 is fluidically connected directly (FIGS. 1 and 2) or indirectly (FIGS. 3 and 4) to the turbine 14 and to the injection pump 13 so as to form a fluid circulation loop entering and leaving the underground deposit 3.

The equipment according to the invention also comprises, in fluid connection to the first pipe 11, upstream of the injection pump 13 and downstream of the underground deposit 3, an electricity generating turbine 14 that is actuable by kinetic energy when fluid passes through it in order to generate electricity. In the present invention, a generating turbine is understood to be a power module comprising a turbine and a generator.

In FIG. 1, this turbine 14 is placed on the seabed 2 of the sea 1 such that it receives the mixture extracted from the deposit at a pressure very close to the pressure P2 in the deposit 3. In other words, the kinetic energy of the mixture is at a maximum and the production of electricity is optimal. Moreover, this embodiment makes it possible to use several seabed wells which send the extracted mixture to a single platform, making it possible to multiply small installations on the seabed to operate the best wells.

In FIG. 2, the turbine 14 is arranged at the surface and fixed to the platform 10.

Preferably, a valve is placed between the wellhead and the turbine 14 in order that the system for producing electrical energy is made flexible and available on demand.

In any case, the equipment according to the invention comprises an electric circuit 15 arranged between the turbine 14 and a member 16 for storing (by way of batteries for example) and/or transmitting the electricity generated by the turbine 14 to the general power grid 17.

This equipment makes it possible to produce electricity as follows: first of all, a mixture of petroleum oil and water from the underwater deposit is extracted under a pressure P2 via a first extraction pipe 11. Advantageously, this mixture is analyzed before the following step to ensure the correct operation of the turbine.

Then, the extracted mixture is made to circulate so as to actuate the electricity generating turbine 14 by kinetic energy in order to generate electricity.

Next, a storage member 16 (with batteries, for example, for subsequent use on the platform or subsequently supplying the power grid 17) is supplied and/or the electricity generated by the turbine 14 is transmitted directly to the general power grid 17 with at least a fraction of the electricity generated by the generating turbine. Preferably, the majority of the electricity produced is injected into the grid or stored, the rest serving to supply the pump 13 for injecting the extraction fluid. In this preferred case, extraction fluid is thus injected into the underground deposit under a pressure P1 with the injection pump, via the second injection pipe 12. This step serves to maintain the pressure within the deposit at values that are useful for the operation of the turbine 14.

The abovementioned steps are then repeated cyclically.

The installation in FIGS. 1 and 2 is usable when the mixture extracted from the underground deposit 3 is poor in petroleum oil, rocks and other products, and therefore rich in good quality water for the turbine. Such a mixture can thus actuate a generating turbine 14 of the axial type or the Pelton type, for example, by kinetic energy, without damaging it, and with excellent efficiency.

When the fluid extracted at the pressure P2 is $CO_2$ gas, the turbine 14 is an axial turbine designed to operate with the $CO_2$ gas and capture the kinetic energy from the flow of gas.

Specifically, the mixture extracted from the underground deposit 3 is in the form of an emulsion of water, oil and grease, ethanol, methanol, isopropanol, acetone (40 to 2000 µg/l), sodium chloride (NaCl: 1000 to 400 000 µg/l), hydrogen sulfide ($H_2S$), carbon dioxide ($CO_2$), sands and fragments of rock.

Such a mixture of these elements may make it impossible to pass through a turbine for reasons of corrosion, viscosity, density, and friction, if the water quality is not fairly high, i.e. if the oil/water ratio is above a given threshold value.

An extracted mixture of acceptable quality for the direct passing through a turbine as illustrated in FIGS. 1 and 2 should therefore have very low levels of salts, sand/fragments of rock, and other oils. It should also have a high permittivity of between 60-80 and very low viscosity, thereby allowing passage through a turbine. A mixture of such a composition that is low in oil is encountered when the deposit is very used up.

However, it is possible for the oil extraction to stop before the extracted mixture has such an oil/water ratio, for example because such extraction is already no longer profitable.

The pressure of the water is also an important item of data for identifying the possibility of using the extracted mixture directly for passing through a turbine. Specifically, if the composition is suitable but the outlet pressure (i.e. of the mixture extracted at the first pipe 11) is insufficient, the efficiency of the installation according to the invention might not be sufficiently profitable.

The embodiment in FIGS. 3 and 4 makes it possible to generate electricity by kinetic energy even when the extracted mixture does not have an oil/water ratio compatible with the use of a generating turbine or when the extraction pressure is insufficient, that is to say below a threshold extraction pressure.

In this embodiment, the installation also comprises, between the first pipe 11 and the generating turbine 14, that is to say upstream of the generating turbine 14, but downstream of the underground deposit 3, a water/petroleum oil separator 18.

This separator makes it possible to separate the petroleum oil from the water. It comprises a line 19 for conveying petroleum oil toward a petroleum oil tank 20, and a line 21 for conveying water toward a water tank 22.

The latter is connected to the generating turbine 14 by a pipe 23 and arranged at a given height H with respect to the generating turbine 14 in order that water falls by gravity into the generating turbine.

The given height H is defined depending on the type of the platform and of its structure, but should allow a waterfall higher than 10 meters, preferably between 10 meters and 30 meters, depending on the specifications of the turbine. The height also depends on the structure of the platform and on the power objectives to be obtained by the generating turbine 14.

Preferably, the minimum height H of the tank 22 with respect to the generating turbine 14 is determined so as to allow the production of at least 50 megawatts of power in total.

Thus, in this embodiment, and compared with the embodiment in FIGS. 1 and 2, the production of electricity comprises, between the step of extracting the mixture from the deposit and the step of passing through a turbine, during which the extracted mixture is made to circulate so as to actuate the electricity generating turbine by kinetic energy, a step of separating the petroleum oil and the water when the oil/water ratio in the mixture is above a given threshold value, and a step of temporarily storing the water obtained at a given minimum height H with respect to the generating turbine.

In this embodiment, the generating turbine is advantageously a turbine of the Kaplan type or of the Francis type, designed for waterfalls. Other solutions may be designed with modern turbines such as axial turbines when there are large volumes of liquid and low heights H. When the fluid extracted at the pressure P2 is $CO_2$ gas, the turbine 14 is an axial turbine designed to operate with the $CO_2$ gas and to capture the kinetic energy from the flow of gas.

In one advantageous embodiment, illustrated in FIG. 4, the installation also comprises a bypass line 30 connected by a three-way valve 31, manually or automatically controllable, to the first pipe 11 upstream of the water/oil separator 18 on one side and either to the water tank 22 or to the line 23 supplying the generating turbine 14 from the water tank 22, or directly to the generating turbine 14, on the other side.

In this embodiment, in a first variant, a change of turbine 14 may be provided between the phase in which the separator 18 and the tank 22 are used (turbine of the Kaplan type or of the Francis type) and the phase in which the fluid extracted from the deposit is sent through the bypass line 30 (turbine of the Pelton type).

Alternatively, and preferably, in a second variant, a turbine of the axial type will be chosen as early as the design of the embodiment in which the oil and water need to be separated beforehand, since this type of turbine can operate at low pressure when receiving the water from the tank, or at high pressure when receiving the water directly from the deposit, possibly involving modifications to the lines that are within the capabilities of a person skilled in the art.

The bypass line 30 makes it possible to directly direct the mixture extracted from the underground deposit toward the generating turbine 14, for operation identical to that described with respect to the embodiment in FIGS. 1 and 2, when the extracted mixture has an oil/water ratio below the given threshold value, above which oil/water separation is necessary.

Preferably, this switching between the two operating modes (with and without oil/water separation) takes place automatically. This is because the composition of the extracted mixture can vary over time.

To this end, the installation according to the invention advantageously comprises a sensor 33 for sensing the composition of the extracted mixture (for example a viscosity sensor) and a central processing unit 32 programmed to determine the oil/water ratio in the extracted mixture, to compare it with a given threshold value stored in a memory, and to control the valves 31 via connections 34 so as to make the extracted mixture circulate through the bypass line 30 directly from the first pipe 11 to the generating turbine 14 when the oil/water ratio in the extracted mixture is below the given threshold value.

In other words, the steps of separating the oil and the water (and optionally of storing the water produced) are omitted when the proportion of oil in the mixture drops below the given threshold value.

When the extracted mixture has passed firstly through the turbine (either as it is or after separation of the oil and the water), it is reinjected directly into the deposit by the pump. The addition of extraction fluid is then only necessary to make up for losses of fluid in the circuit and to manage the values of P1 and P2.

Preferably, the member 16 and/or the power grid comprise an electricity storage reserve for example in the form of batteries.

The objective remains for most of the electrical energy to be sent away from the platform, for example to other adjacent platforms that require energy, or to be injected into the general grid on the coast.

The injection of electrical energy in the form of alternating current AC into the general grid is currently economically acceptable if the platform is located less than 80 km from the coast.

In this case, a 132 kV transformer station will need to be installed on the platform. Then, the station will be connected to the general grid by 132 kV AC underwater cables which will be placed between the platform and the coast.

The invention thus makes it possible to create a renewable, continuous, flexible, on-demand and non-intermittent energy source, by virtue of the creation of a fluidic circulation loop of water or gas (such as $CO_2$ for example) entering and leaving an underground deposit.

The invention claimed is:

1. A method for producing electricity with an existing oil extraction installation (10) designed to extract petroleum oil and water from an underground deposit (3), the method comprising the following steps:
    a) extracting a mixture of petroleum oil and water from the underground deposit (3) under a pressure P2 via a first extraction pipe (11);
    b) separating the petroleum oil and the water when the oil/water ratio in the extracted mixture from the underground deposit (3) is greater than a given threshold value;
    c) temporarily storing the water obtained at a given minimum height (H) with respect to an electricity generating turbine;
    d) circulating the obtained water to actuate the electricity generating turbine (14) by kinetic energy in order to generate electricity; and
    e) supplying a power grid (17) with at least a fraction of the electricity generated by the electricity generating turbine (14).

2. The method for producing electricity according to claim 1, also comprising a step f) of injecting an extraction fluid into the underground deposit (3) under a pressure P1 with an injection pump (13), via a second injection pipe (12).

3. The method for producing electricity according to claim 2, wherein the pressure P1 is adjusted so as to keep the pressure P2 at a given value for actuating the electricity generating turbine (14) by kinetic energy in order to generate electricity.

4. The method for producing electricity according to claim 2, wherein the extraction fluid comprises at least a part of the mixture extracted in step a).

5. The method for producing electricity according to claim 2, wherein the injection pump (13) is supplied with electricity using at least a fraction of the electricity generated by the electricity generating turbine (14), in order to repeat steps a) to e).

6. The method for producing electricity according to claim 2, wherein the extraction fluid comprises $CO_2$ gas, a part of the extracted mixture, and/or sea water.

* * * * *